United States Patent [19]

Clay

[11] 4,302,030

[45] Nov. 24, 1981

[54] SEAT BELT SYSTEMS

[75] Inventor: William S. G. Clay, Brampton, England

[73] Assignee: Kangol Magnet Limited, Carlisle, England

[21] Appl. No.: 95,941

[22] Filed: Nov. 20, 1979

[30] Foreign Application Priority Data

Nov. 20, 1978 [GB] United Kingdom ............... 45187/78

[51] Int. Cl.³ ......................................... B60R 21/02
[52] U.S. Cl. ................................... 280/802; 280/807; 180/282; 180/286
[58] Field of Search ............... 280/806, 807, 801, 803, 280/804, 802; 180/281, 282, 286, 268; 242/107.4 A

[56] References Cited

U.S. PATENT DOCUMENTS

| | | | |
|---|---|---|---|
| 4,007,802 | 2/1977 | De Rosa | 280/803 |
| 4,083,581 | 4/1978 | Clifford | 280/803 |
| 4,181,326 | 1/1980 | Hollowell | 280/806 |
| 4,209,186 | 6/1980 | Close | 280/806 |

FOREIGN PATENT DOCUMENTS 795517 5/1958 United Kingdom .

*Primary Examiner*—Robert R. Song
*Attorney, Agent, or Firm*—Young & Thompson

[57] ABSTRACT

A large road vehicle has a cabin subject to accelerations in normal driving conditions in excess of accelerations experienced by the vehicle as a whole and which are sufficient to lock the acceleration responsive retractor of the driver's seat belt system unnecessarily. To prevent such locking except under genuine emergency conditions, a solenoid in the retractor holds inoperative a locking mechanism responsive to retractor acceleration, until an inertia switch located on the vehicle chassis (and thus less exposed to acceleration than the cabin mounted retractor) senses a predetermined vehicle acceleration, when the switch de-energizes the solenoid to permit the retractor acceleration sensing mechanism to operate. The seat belt system is passive and a switch operated by the handle of the door adjacent the seat is open when the door is closed but closed when the door is opened so as to energize the solenoid and thereby prevent inadvertent locking during door opening movement.

11 Claims, 5 Drawing Figures

SEAT BELT SYSTEMS

BACKGROUND OF THE INVENTION

The invention relates to a vehicle seat belt system.

Vehicle seat belt systems conventionally include a retractor from which a belt can be withdrawn for use against the tension of a retractor spring. So that the belt holds the user in his seat during an emergency, the retractor locks against belt withdrawal, usually in response to excessive belt acceleration and/or in response to excessive acceleration (which term is used herein to include, where appropriate, deceleration) of the vehicle, and thus of the retractor mounted in the vehicle.

In certain circumstances, the sensitivity of the retractor necessary to ensure locking in emergency conditions can have disadvantageous consequences. An example occurs in respect of seat belt systems used in the cabins of large commercial road vehicles. Such cabins have a certain freedom of movement relative to the chassis of the vehicle, so that even under normal driving conditions, the cabin, and thus the retractor, undergoes relatively high levels of acceleration. These accelerations can be sufficient to cause locking of the retractor in circumstances where restraint of the user by the belt is not needed. This restraint can be inconvenient, for example, in restricting the driver in carrying out movements necessary to the control of the vehicle.

The seat belt system may be a "passive" one, that is, one which is arranged to come into use without the user being required to take any action specifically for the purpose. For example, the system may be such that the belt is applied to the occupant of a vehicle seat under mechanical or electrical power as a consequence of his sitting down in the seat. When such a system has a retractor with a retractor acceleration sensitive locking mechanism, it can happen that locking occurs when the vehicle is parked on an inclined and/or as a consequence of retractor movement when a person enters or leaves the cabin. Locking in these circumstances also is undesirable as movement into and out of the seat and/or proper functioning of the passive system may be hindered or prevented. Such undesirable locking can occur in such circumstances with retractors which lock in response to retractor acceleration even where the system is not a passive one.

All these circumstances discourage use of the seat belt, or where the system is a passive one, encourage attempts to evade its use.

It is therefore an object of the invention to provide a seat belt system including a retractor which locks against belt withdrawal in response to a predetermined acceleration condition, in which undesired locking is prevented in a simple way without diminution of the protection which the system affords.

It is also an object of the invention to provide a simple and convenient means for inhibiting locking of an acceleration sensitive emergency locking seat belt retractor in response to spurious accelerations.

It is a further object of the invention to provide, in a vehicle having a seat belt system including an acceleration sensitive locking retractor, means inhibiting locking of the retractor unless the vehicle experiences an emergency acceleration condition.

It is an additional object of the invention to provide a seat belt system including a retractor, in which inadvertent locking of the retractor is overcome in response to a door opening operation.

SUMMARY OF THE INVENTION

According to the invention, a seat belt system comprises a retractor for seat belt, acceleration sensitive locking means for locking the retractor against belt withdrawal in response to a predetermined acceleration, anti-locking means operative to prevent such locking of the retractor, and disabling means for rendering the anti-locking means inoperative in response to the sensing of an acceleration at a location spaced from the retractor.

Thus in a large vehicle in which the retractor is mounted in a cabin exposed to accelerations exceeding those experienced by the chassis, electrical anti-locking means, for example an electromagnet acting on a locking member, can be provided in the retractor, under control of disabling means, for example an inertia switch, located on the chassis.

The retractor locking means may be responsive either to belt withdrawal acceleration, or to retractor acceleration, or to both. Conveniently, however the locking means is sensitive to both accelerations and the anti-locking means prevents locking in response to retractor acceleration only.

The invention can also provide such a seat belt system in which having enabling means for rendering the anti-locking means operative in response to dooropening movement of an associated vehicle door, or to operation of the door handle, regardless of the condition of the disabling means.

The provision of such enabling means can thus prevent undesirable retractor locking as may occur for example with a door mounted retractor when the door is opened quickly, because of the resultant belt and/or retractor acceleration. Such locking can be very disadvantageous where the retractor is included in a passive system in which the belt is withdrawn from the retractor during door opening movement.

Undesired locking can also occur when the vehicle is parked on a steep incline, with a retractor having retractor acceleration sensitive means which are responsive also to tilting, whether mounted on the vehicle door or on the vehicle body. Locking in these circumstances can again be particularly disadvantageous when the retractor is included in a passive system.

In accordance with this feature of the invention, a switch operated by the door handle can be arranged to effect energisation of a solenoid constituting the anti-locking means, thus rendering these means operative so as to prevent retractor locking.

BRIEF DESCRIPTION OF THE DRAWINGS

The invention is further described below, by way of example, with reference to the accompanying drawings, in which.

Figure 1:
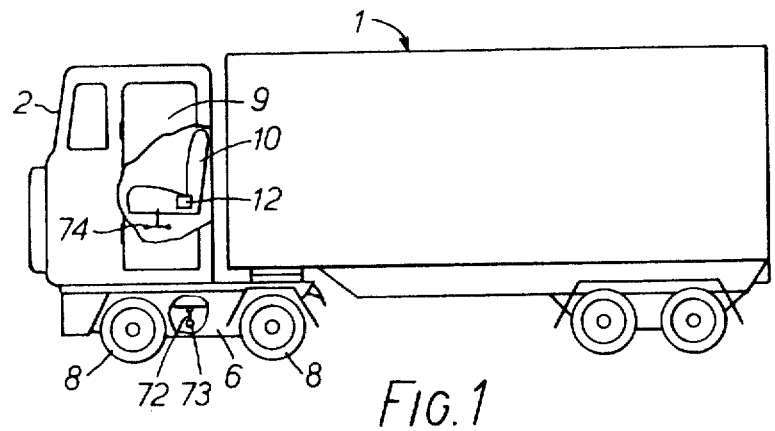
FIG. 1 is a schematic side view, with parts broken away to reveal the interior, of a large commercial road vehicle incorporating a seat belt sytem in accordance with the invention.
Figure 5:
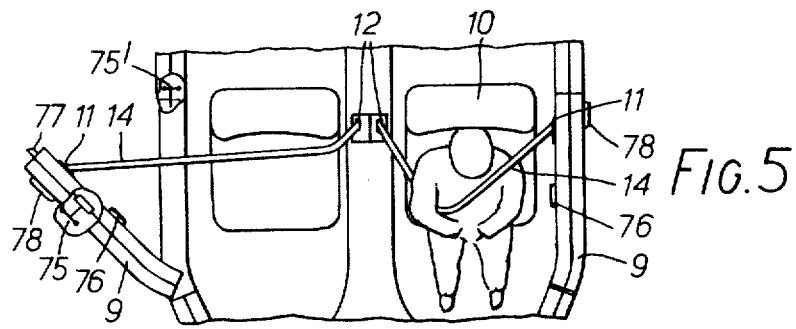
FIG. 5 is a schematic sectional plan view of the cabin of the vehicle shown in FIG. 1.

As indicated schematically in FIG. 1, a large commercial vehicle 1, which may but need not be an articulated truck or lorry as shown, has a cabin 2, for the driver and one or more passengers, mounted at a relatively high position above a chassis 6 on which the road wheels 8 are carried. The cabin 2 contains a seat 10 for the driver and an adjacent seat, each seat being provided with a passive seat belt system. The systems are alike and only that associated with the driver's seat will be described. The seat belt system comprises a retractor 12 mounted inboard, on the cabin floor between the seats, from which a seat belt 14 extends diagonally upwardly across the seat back to an end securement 11 positioned at the upper rear corner of the cabin door 9. As will be clear from a comparison of the left-hand and right sides of FIG. 5, showing the open and closed positions respectively of the cabin door, opening of the door causes the belt 14 to be withdrawn from the retractor 12, against the pull of a retractor spring. On entering the seat, the occupant must position himself between the belt 14 and the seat back. When the door is closed, the retractor spring pulls the belt 14 snugly across the user's torso.

This simple passive system can be replaced if desired by more complex systems in which the belt is withdrawn from and applied to the user by mechanical or electrical means. The belt system can have any desired configuration, for example a so-called 3-point configuration with shoulder and lap belt portions extending across the user.

The retractor 12 illustrated is of the kind disclosed in U.S. Ser. No. 074335 filed on Sept. 11, 1979 by David Laurence Standing and assigned to the present Applicant, to which reference may be made for further particulars.

Figure 3:
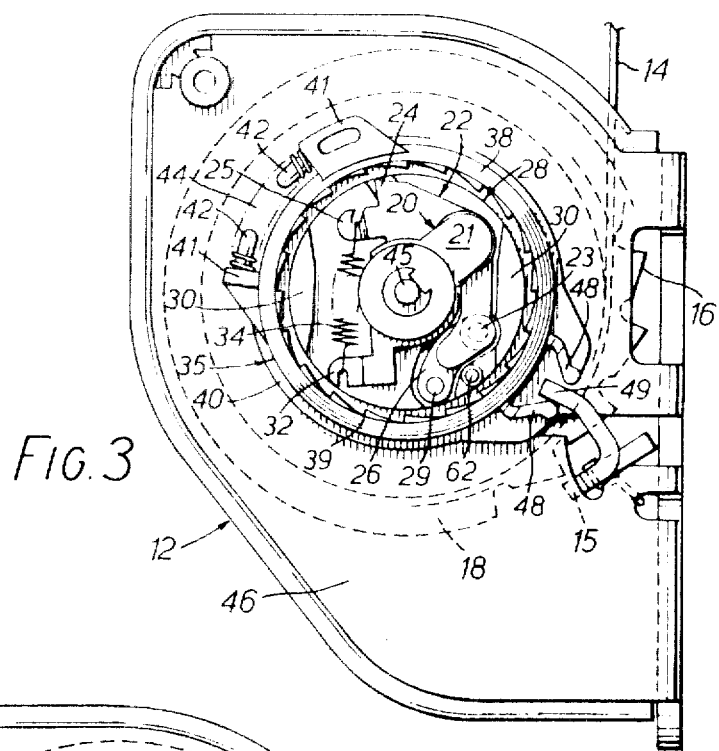
FIGS. 3 and 4 are side views of a retractor included in the seat belt system, parts being omitted or broken away for purposes of explanation.
Figure 4:
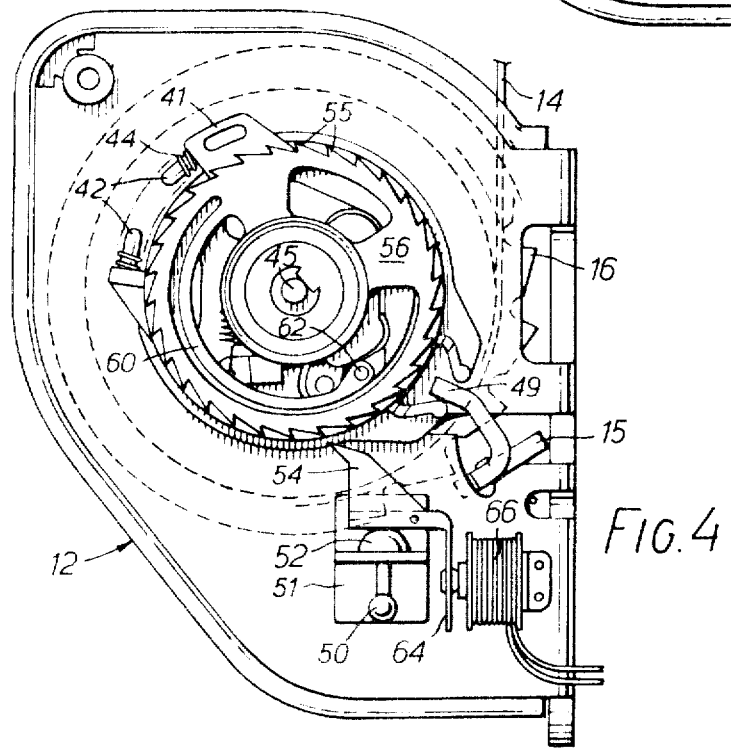

As shown in FIGS. 3 and 4, the retractor has a main spindle 45 on which the belt 14 is wound. The spindle is journalled in side flanges of a main frame. Externally of one side flange, the retractor spring (not shown) acts on the spindle 45 and externally of the other side flange 46, the spindle 45 is connected to an acceleration sensitive locking mechanism. The mechanism comprises a lock bar 15 received through apertures in the side flanges for pivoting from the out-of-use position shown to a locking position in engagement with teeth 16 of a ratchet wheel 18 secured to the main spindle 45. The lock bar 15 has an extension 49 engaged by teeth 48 projecting from a ring member 40 which may be turned in the anti-clockwise direction as shown in response to the sensing of either or both of a predetermined acceleration of the belt 14 in the withdrawal direction, or of the retractor as a whole in any horizontal direction.

As most clearly shown in FIG. 3, a two-lever linkage of which one link comprises a pawl member 22 pivoted at an intermediate position thereon to the shaft 45 by a member 21. The member 22 is pivotally connected at 23 to one end to a linking lever 26 pivoted at 29 on a flywheel 28, with weighted portions 30, which normally rotates with the main spindle 45, but which lags with respect to the spindle when belt 14 is withdrawn at more than a predetermined acceleration. This lagging of the flywheel 28 causes the linkage 22,26 to extend, against the pull of a spring 34 acting between the pawl member 22 at 25 and an extension of the member 21, at 32. This movement causes a tooth 24 at the other end of the member 22 to be brought into engagement with one of a series of teeth 39 around the interior of a cup member 35. The cup member 35 is carried by the flange 46 coaxially of the shaft 45 and is received within the ring member 40. The cup and ring members are connected together through a spring 44 held on pins 42 mounted by radial projections 41 extending from the cup member and the ring member respectively. The engagement of the tooth 24 with one of the teeth 39 causes rotation of the spindle 45, as belt withdrawal continues, to be transferred to the cup member 35, through to the ring member 40 and thus to the projection 49 of the lock bar 15, so that the retractor becomes locked against belt withdrawal. The cup and ring members 35,40 co-operate to provide a lost motion connection between the locking drive from the main spindle and the actual locking arrangements receiving this drive.

The mechanism also comprises means to effect locking in response to acceleration of the retractor which acts through the belt sensitive mechanism in that it acts to hold back the flywheel, so that locking results in the same way as if the flywheel lagged on the spindle through its own inertia.

As best shown in FIG. 4, an inertia mass 50 in the form of a pendulum suspended from a sub-frame 51 secured on the outer side of the side flange 46 by a stem depending from an annular cap 52, so that the pendulum will tilt about a point on the periphery of the cap in response to an acceleration above a predetermined amount. When such an acceleration occurs, the cap member 52 engages a lever 54 pivoted on the sub-frame 51 to cause this to pivot and bring a tooth portion thereof into engagement with external ratchet teeth 55 on the rim of a ratchet wheel 56 rotatably carried by the member 20. The wheel 56 is also connected to the flywheel 28 by way of a resiliently flexible internal arm 60 thereof, the free end of which is secured to the flywheeel at 62. Engagement of the lever 54 with one of the teeth 55 stops rotation of the wheel 56 and continuing rotation in the belt withdrawal detection of the flywheel 28 with the main spindle results in a braking action on the former during which the arm 60 flexes inwardly, functioning as a lost motion connection.

It will be seen from FIG. 4, that the lever 54 has an integral downwardly extending arm 64. This functions as the armature of a solenoid 66 mounted on the outer side of the side flange 64. When energised, the solenoid 66 exerts sufficient attractive force on the arm 64 to hold the lever 54 against pivotation, whatever acceleration may be experienced by the inertia mass 50, or to restore it to the position shown if tilted because of an acceleration.

Figure 2:
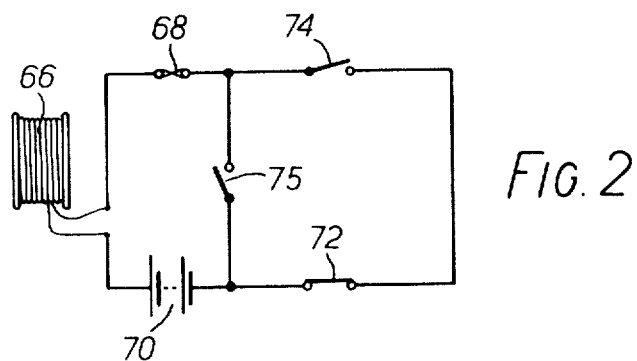
FIG. 2 is a circuit diagram of the seat belt system.

The solenoid 66 is connected into the circuit shown in FIG. 2, in series with a fuse 68, an electric power source 70, which can conveniently be constituted by the vehicle battery, an inertia switch 72, and a seat switch 74. As schematically indicated in FIG. 1, the inertia switch 72 is mounted on the chassis 6 of the vehicle. The inertia switch comprises an acceleration responsive inertia mass 73 mounted to function as a pendulum. When the mass 73 experiences a sufficient acceleration, it tilts and effects opening of the normally closed contacts of the inertia switch. The seat switch 74 has contacts which are normally open, but which are closed by the weight of an occupant when he occupies the seat 10. The switch 74 serves to prevent unnecessary drain on the source 70, because it holds the circuit inoperative when the vehicle is not being driven; instead, energization of the circuit could be made dependent on the turning of the vehicle ignition key.

As soon as the seat 10 is occupied, closure of switch 74 energises the solenoid 66, so that the retractor 12 is held against locking in response to retractor acceleration, provided with inertia switch 72 does not experience sufficient acceleration to open. During this time, acceleration of the retractor 12 cannot result in locking against belt withdrawal, because the lever 54 is held in the disengaged position shown in FIG. 4, in spite of any tendency of the inertia mass 50 to cause it to pivot. Consequently, the cabin 2 can experience quite large accelerations, provided no considerable accelerations are experienced also by the chassis 6. The inertia switch 72 is set to operate at an acceleration level such as would be experienced during emergency conditions, so that as soon as the inertia mass 73 moves to open the switch, the solenoid coil 66 is de-energised and the inertia mass 50 is free to bring about locking of the retractor. Both inertia masses 50 and 73 can be arranged to move operatively at 0.4 G for example, but if desired, inertia mass 73 can be arranged to move at a slightly lower acceleration. Throughout, the retractor 12 can be locked in response to belt acceleration sensitive arrangements which it includes.

The circuit of FIG. 2 includes also a switch 75 connected in an arm of the circuit in parallel with the switches 72,74. The switch 75 is normally open but is arranged to close when either the internal handle 76 or the external handle 78 of the door 9 is operated as a preliminary to an opening amount of the door. As schematically shown in FIG. 5, the switch 75 is operatively associated with linkage within the door which connects the handles 76,78 together and with the door latch 77.

In normal circumstances, when the vehicle comes to a half on reasonably level ground, the switch 72 will be closed and the retractor acceleration sensitive mechanism of the retractor 12 will be held inoperative. If however the vehicle 1 is parked on a steep incline, the inertia mass 50 will tilt the lever 54 so that opening of the door 7 will be prevented because the belt 14 cannot be withdrawn from the retractor. The solenoid 66 will not of course be energised to prevent this because the inertia mass 73 will be tilted also and the switch 72 will be open. A similar situation will be reached if the vehicle were to be rolled onto its side in an accident. The operation of the handle of the door 9 however will effect closure of the switch 75 so the solenoid 66 will be energised through this switch. Consequently, the lever 54 is moved free of the teeth 55 and to restore the inertia mass so to its normal position, so that the door opening movement is unhindered by retractor locking. Belt acceleration during normal door opening is not sufficient to effect retractor locking on its own.

The switch 75 of course revert to its normal open position when the door 9 resumes its closed position so there is drain on the source 70 until the door is again opened.

In an alternative arrangement, the switch 75 is replaced by a door switch 75' positioned to have a normal open condition when the door 9 is closed but is moved to a closed position when the door is opened. The operation of the circuit is as previously described but a door handle controlled switch has the advantage of being rendered effective to release the retractor before the door begins to move, whereas the door switch will not so act until the door has moved through at least a few degrees.

When the door 9 has closed after the seat occupant has left the cabin 2, the circuit is de-energised until the door is again opened, when the retractor is again prevented from locking until the door has again been closed.

The switch 75 or 75' can be omitted if desired, as when the seat belt system is not a passive one. Moreover, the circuit elements 72,74 can be omitted if desired, as when the system is being employed in a vehicle in which the retractor 12 is not likely to experience accelerations in excess of those experienced elsewhere in the vehicle, as in small vans, private cars, etc.

The solenoid of the seat belt system associated with the seat adjacent the seat 9 can conveniently be included in the same circuit as the solenoid 66 to avoid duplication of parts, as by being connected in parallel therewith.

It will be evident that the arrangements specifically described and shown can be varied in many ways within the scope of the invention. For example, the solenoid could be arranged to act on the locking bar 15, so that both the belt sensitive and strap sensitive mechanisms of the retractor 12 are held inoperative until the inertia switch 72 senses a sufficient acceleration of the chassis 6 or the door 9 is opened. The belt acceleration sensitive locking mechanism can if desired be omitted, the lever 54 for example being then arranged to act directly or indirectly on the ratchet wheel 18.

I claim:

1. In a vehicle including a chassis, a cabin, means mounting said cabin on said chassis to permit said cabin to experience accelerations in excess of those experienced by the chassis, and a seat and a seat belt system associated therewith mounted in said cabin, said seat belt system including a seat belt retractor adapted to lock against belt withdrawal in response to acceleration of the retractor beyond a first predetermined amount, the improvement comprising electrical anti-locking means in said retractor and having a first condition preventing locking thereof and a second condition permitting such locking, electrical acceleration sensing means adapted to change condition in response to an acceleration of said chassis exceeding a second predetermined amount, an electrical supply source, and circuit means connecting together said anti-locking means, said means and said supply source so that said anti-locking means is in said first condition thereof until said sensing means changes condition in response to said chassis acceleration.

2. The vehicle of claim 1 wherein said electrical anti-locking means comprises a solenoid, and said acceleration sensing means comprises an inertia switch said solenoid and said inertia switch being connected in series with said electrical supply source, whereby said solenoid is energised into said first condition thereof unless said switch opens.

3. The vehicle of claim 2 further comprising a seat switch connected in series in said circuit means, said seat switch being adapted to disconnect said solenoid from said supply source to thereby cause said solenoid to assume said second condition thereof except when said seat is occupied.

4. The vehicle of claim 1 further comprising a door carried by said cabin for movement between door open and door closed positions, electrical means included in said circuit means and responsive to door opening movement to change condition and thereby cause said anti-locking means to assume said first condition thereof.

5. The vehicle of claim 2 further comprising a door carried by said cabin for movement between door open and door closed positions, latch means for latching said door in said closed position, handle means manually operable to release said latch means to door opening movement of said door, switch means connected in said circuit means in parallel with said inertia switch across said supply source and said solenoid, and means operatively connecting said handle means and said switch means whereby operation of said handle means for door opening movement closes said switch means to energise said solenoid into the second condition thereof, said switch means reverting to open condition on door closure.

6. The vehicle of claim 1 wherein said retractor comprises a locking means operable to lock the retractor against belt withdrawal, a first inertia means responsive to belt withdrawal acceleration at more than a predetermined rate to effect operation of said locking means, a second inertia means responsive to said retractor acceleration to cause said second inertia means to effect said operation of said locking means, and wherein said anti-locking means in the second condition thereof is adapted to prevent responsiveness of said second inertia means to said retractor acceleration.

7. In a vehicle including a chassis, a cabin capable of movement relative to the chassis, and a seat in the cabin, a seat belt system associated with said seat and comprising a seat belt, a retractor for said seat belt, locking means adapted to lock said retractor against belt withdrawal in response to a predetermined acceleration due to acceleration of said cabin, anti-locking means operative to prevent said retractor locking, and disabling means operatively connected to said chassis for rendering said anti-locking means inoperative in response to the sensing of a second predetermined acceleration of said chassis.

8. The vehicle of claim 7 wherein said locking mechanism is responsive to at least one of retractor acceleration and belt withdrawal acceleration.

9. The vehicle of claim 7 wherein said locking means comprises a locking member, an inertia mass, means mounting said inertia mass for movement in response to a predetermined acceleration of the retractor, to thereby move said locking member to effect said retractor locking, and wherein said anti-locking means comprises an electromagnet, a portion of said locking member cooperative therewith, and circuit means for energizing said electromagnetic to act on said portion to hold said locking member against said movement.

10. The vehicle of claim 9 wherein said disabling means comprises a normally closed inertia switch included in said circuit means.

11. The vehicle of claim 7 wherein a door is movably carried by said cabin adjacent said seat, wherein said acceleration sensitive locking means and said disabling means are responsive additionally to being in a tilted position, and wherein enabling means is provided for rendering said anti-locking means operative in response to opening of said door.

* * * * *